(12) United States Patent
Kjelland

(10) Patent No.: US 6,660,169 B2
(45) Date of Patent: Dec. 9, 2003

(54) METHOD AND APPARATUS FOR RECLAIMING DEICER FROM PRODUCED WATER OF AN OIL WELL

(76) Inventor: Kevin Melvin Kjelland, 4820 - 51 Avenue, Breton, Alberta (CA), T0C 0P0

(*) Notice: Subject to any disclaimer, the term of this patent is extended or adjusted under 35 U.S.C. 154(b) by 0 days.

(21) Appl. No.: 10/143,226

(22) Filed: May 9, 2002

(65) Prior Publication Data
US 2002/0170813 A1 Nov. 21, 2002

(30) Foreign Application Priority Data
May 15, 2001 (CA) .............................. 2347462

(51) Int. Cl.[7] .............................. C02F 1/00; C02F 1/02
(52) U.S. Cl. .................. 210/747; 166/267; 202/158; 202/176; 203/14; 203/18; 210/97; 210/175; 210/259; 210/774
(58) Field of Search ................. 166/267, 302; 202/152, 158, 159, 176, 180, 181; 203/1, 14, 18, 19; 210/97, 175, 180, 182, 774, 806, 747, 259; 62/647, 653

(56) References Cited

U.S. PATENT DOCUMENTS 4,743,343 A * 5/1988 Sakai .......................... 203/18
5,225,048 A * 7/1993 Yuan ........................... 203/18
6,141,989 A * 11/2000 Oakley ......................... 62/647

* cited by examiner

Primary Examiner—Joseph Drodge
(74) Attorney, Agent, or Firm—Davis & Bujold, PLLC

(57) ABSTRACT

A method and an apparatus for reclaiming deicer from produced water of an oil or gas well includes a fractionation tower having a top condenser section, a bottom heat exchanger section and an intermediate packing section. A deicer outlet is positioned in the condenser section, for removal of condensed deicer. An inlet is provided to receive produced water contaminated by deicer. The inlet is coupled to the condenser section such that produced water must pass through the condenser to enter the inlet. A water outlet is provided in the heat exchanger section. Operation of the water outlet is controlled to maintain a predetermined level of accumulated water in the heat exchanger section. The heat exchanger is adapted to be coupled with a source of hot fluids produced by an external heat source. The circulation of hot fluids through the heat exchanger heats accumulated water in the heat exchanger section.

4 Claims, 1 Drawing Sheet

METHOD AND APPARATUS FOR RECLAIMING DEICER FROM PRODUCED WATER OF AN OIL WELL

FIELD OF THE INVENTION

The present invention relates to a method and an apparatus for reclaiming deicer from produced water of an oil well and, in particular, methanol.

BACKGROUND OF THE INVENTION

Oil or gas wells frequently produce a mixed stream of gas, liquid hydrocarbons and water. The mixed stream flows or is pumped to surface and separated. After recovery of the oil and/or gas, the produced water is reinjected into a disposal well.

In cold weather conditions, there is a danger of the mixed stream freezing or hydrating due to the presence of water. Freezing or hydrating can occur anywhere in the process before the water content is totally removed. In order to prevent freezing or hydrating, a deicer is injected into the mixed stream of oil and water. There are various substances suitable for use as deicer, methanol being one of the most common.

The water stream being injected into disposal wells at the present time can consist of as much as 90% methanol. It is theoretically possible to recover this methanol through a distillation process, however, this has not been done to date due to the high energy costs associated with such a distillation process.

SUMMARY OF THE INVENTION

What is required is a method and an apparatus for reclaiming deicer from produced water of an oil or gas well in a cost effective manner.

According to the present invention there is provided an apparatus for reclaiming deicer from produced water of an oil well which includes a fractionation tower having a top condenser section, a bottom heat exchanger section and an intermediate packing section. A condenser is positioned in the condenser section. A deicer outlet is positioned in the condenser section, for removal of condensed deicer. An inlet is provided to receive produced water contaminated by deicer. The inlet is coupled to the condenser section such that produced water must pass through the condenser to enter the inlet. A water outlet is provided in the heat exchanger section. Means is provided for controlling operation of the water outlet to maintain a predetermined level of accumulated water in the heat exchanger section. A heat exchanger positioned in the heat exchanger section. The heat exchanger is adapted to be coupled with a source of hot fluids produced by an external heat source. The circulation of hot fluids through the heat exchanger heats accumulated water in the heat exchanger section.

The recovery of deicer will always taken place after water contaminated by deicer has been separated from oil. The separation of water and oil is a process that requires a lot of energy, a large portion of which is currently wasted. The present apparatus is designed to run off excess heat generated during oil separation. This excess heat, in the form of hot fluids, is passed through the heat exchanger of the fractionation tower to heating costs. In order to condense the deicer after separation, the produced water stream is passed through the condenser prior to entering the fractionation tower through the inlet.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
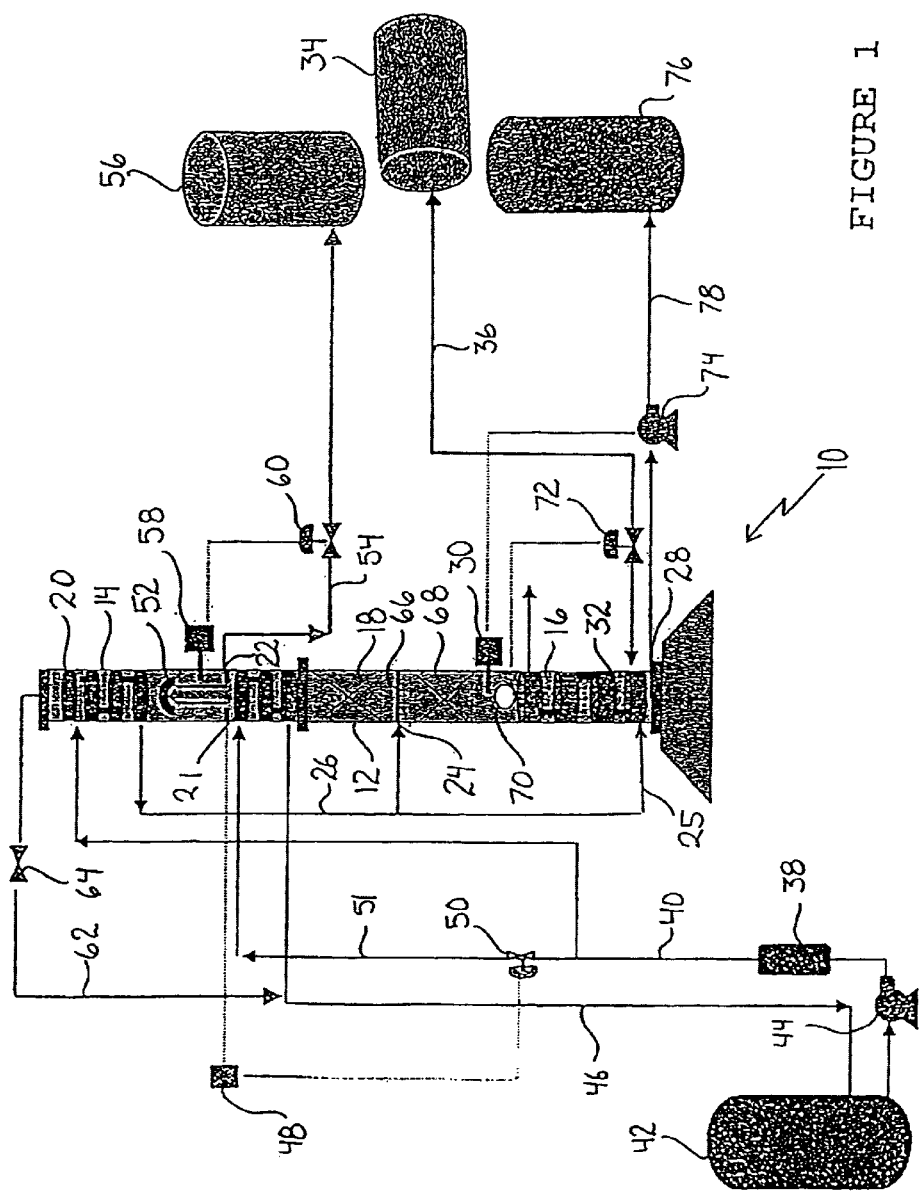
FIG. 1 is a side elevation view, in section, of an apparatus for reclaiming deicer from produced water of an oil or gas well constructed in accordance with the teachings of the present invention.

The preferred embodiment, an apparatus for reclaiming deicer from produced water of an oil or gas well generally identified by reference numeral 10, will now be described with reference to FIG. 1.

Referring to FIG. 1, there is provided an apparatus 10 for reclaiming deicer from produced water of an oil or gas well. Apparatus 10 includes a fractionation tower 12 that has a top condenser section 14, a bottom heat exchanger section 16 and an intermediate packing section 18. Two condensers 20 and 21 are positioned in condenser section 14. A deicer outlet 22 is provided in condenser section 14 for the removal of condensed deicer. A first inlet 24 is provided in packing section 18 to receive produced water contaminated by deicer. A second inlet 25 is also provided so that inlet feed can, alternatively, be fed into heat exchanger section 16. Both first inlet 24 and second inlet 25 are coupled to condenser section 14 by a flow line 26 in such a manner that produced water must pass through condensers 20 and 21 to enter either first inlet 24 or second inlet 25. A water outlet 28 is provided in heat exchanger section 16. A controller 30 is provided for controlling the operation of water outlet 28 in order to maintain a predetermined level of accumulated water in heat exchanger section 16. A heat exchanger 32 is positioned in heat exchanger section 16. In the illustrated embodiment, heat exchanger 32 is adapted to be coupled with a heat source 34 which supplies hot fluids (either liquid or gas) through a flow line 36 to circulate through heat exchanger 32 and heat accumulated water in heat exchanger section 16. It will be appreciated that alternative external sources of hot fluids could also be used.

Filters 38 are positioned on a flow line 40 upstream of inlet 24, whereby solid contaminants in produced water are removed. A storage tank 42 is provided for containing produced water contaminated by deicer. First flow line 40 extends from storage tank 42 to condenser section 14 of fractionation tower 12. A pump 44 is provided to pump produced water through filters 38 and along flow line 40.

A return flow line 46 extends from condenser section 14 to storage tank 42. Condenser section 14 includes a top temperature controller 48 and a flow control valve 50. A hat tray 52 is also provided in condenser section 14. A flow line 54 extends from deicer outlet 22 to a storage tank 56 for deicer. Condenser section 14 includes a top level controller 58 which operates a control valve 60 on flow line 54. Condenser section 14 also has a return flow line 62 with a pressure control valve 64. Return flow line 62 connects up with return flow line 46.

Packing section 18 includes a feed tray 66, packing 68 and packing 69. Heat exchanger section 16 has a temperature controller 70 and flow control valve 72. A pump 74 is provided to pump accumulated water in heat exchanger section 16 to a storage tank 76 through a flow line 78 that extends from water outlet 28 of heat exchanger section 16 of fractionation tower 12 to storage tank 76.

The use and operation of apparatus 10 will now be described with reference to FIG. 1. Referring to FIG. 1, in order to reclaim deicer from produced water, produced water from storage tank 42 is pumped by pump 44 along flow line 40 and through filters 38 to remove any solid contaminants. After passing through filters 38, produced water continues to flow along first flow line 40 to condensers 20 and 21 in condenser section 14 of fractionation tower 12. As produced water passes through condenser section 14 its temperature is raised and it, in turn, serves to cool condensers 20 and 21. After produced water has passed through condensers 20 and 21, produced water flows through flow line 26 to first inlet 24 of packing section 18 or second inlet 25 of heat exchanger section 16. Feed tray 66 in packing section 18 disperses produced water so that produced water drops down through feed tray 66 and through packing 68. After passing through packing 68, produced water passes into bottom heat exchanger section 16 for heat energy transfer. Produced water is heated close to a boiling point by the circulation of hot fluids from heat source 34 through heat exchanger 32 which causes deicer to break out of produced water in a vapour state. Deicer vapour then passes up through packing section 18. Water vapours condense at this point and fall back down fractionation tower 12 to accumulate in heat exchanger section 18. Deicer vapours continues to rise up through condenser 21. Condenser 21 is controlled by a top temperature controller 48 which operates temperature control valve 50. Top temperature control valve 50 allows a slip stream of cold inlet produced water to flow up through a flow line 51 and into condenser 21 to insure that any remaining water vapours are condensed by controlling condenser section 14 of fractionation tower 12 at a critical temperature. Produced water then returns through return flow line 46 back to produced water storage tank 42.

Vaporized deicer then passes up through hat tray 52 in condenser section 14 where now recondensed deicer exits fraction tower 12 though flow line 54 which is connected to deicer outlet 22 in condenser section 14. A top level controller 58 is provided for operating top level control valve 60 to control the flow of deicer along flow line 54 to a storage tank 56. Any remaining deicer vapours that are not recondensed in condenser 21 will return through flow line 62 to produced water storage tank 42 or to waste gas flow line 47. Pure water collects in bottom heat exchange section 16 of fractionation tower 12. The level of water collected is controlled by bottom level controller 30 which controls pump 74 Pump 74 pumps water free of de-icer through flow line 78 to water storage tank 76

As described above, apparatus 10 is designed to run off excess heat generated during the processing of gas or liquid hydrocarbons. These processes provide several potential heat sources for use as heat source 34, such as oil separators. Excess heat, in the form of hot fluids, is passed through heat exchanger 32 of fractionation tower 12 to reduce heating costs. In order to condense deicer after separation, produced water is passed through condensers 20 and 21 prior to entering fractionation tower 12 through first inlet 24 or second inlet 25. The method and apparatus 10 as described above, allows for the reclaiming of deicer from produced water of an oil well in a cost effective manner.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for reclaiming deicer from produced water of an oil well, comprising:
   a fractionation tower having a top condenser section, a bottom heat exchanger section and an intermediate packing section;
   at least one condenser positioned in the condenser section, the at least one condenser having an internal conduit through which cooling fluids flow;
   a deicer outlet positioned in the condenser section, for removal of condensed deicer;
   at least one inlet in the tower to receive produced water contaminated by deicer, the inlet being coupled to the internal conduit of the at least one condenser such that produced water must pass through the at least one condenser to enter the at least one inlet;
   a water outlet in the heat exchanger section;
   means for controlling operation of the water outlet to maintain a predetermined level of accumulated water in the heat exchanger section;
   a heat exchanger positioned in the heat exchanger section, the heat exchanger having an internal conduit adapted to be coupled with a source of hot fluids produced by an external heat source, the circulation of hot fluids through the heat exchanger heating accumulated water in the heat exchanger section.

2. The apparatus as defined in claim 1, wherein filters are positioned upstream of the inlet, whereby solid contaminants in the produced water are removed.

3. The apparatus as defined in claim 1, wherein heat for the heat exchanger is supplied by waste heat in the form of hot fluids generated during hydrocarbon processing.

4. A method for reclaiming deicer from produced water of an oil well, comprising:
   providing a fractionation tower having:
      a top condenser section, a bottom heat exchanger section and an intermediate packing section;
      at least one condenser positioned in the condenser section;
      a heat exchanger positioned in the heat exchanger section;
      a deicer outlet positioned in the condenser section, for removal of condensed deicer;
      at least one inlet to receive produced water contaminated by deicer in at least one of the packing section and the heat exchanger section;
      a water outlet in the heat exchanger section; and
      means for controlling operation of the water outlet to maintain a predetermined level of accumulated water in the heat exchanger section;
   passing produced water from an oil well through an internal conduit of the condenser to cool the condenser section in an energy efficient manner; and
   passing waste heat in the form of hot fluids from an oil separator through an internal conduit of the heat exchanger to heat accumulated water in the heat exchanger section in an energy efficient manner.

* * * * *